United States Patent
Jang

[11] Patent Number: 5,952,787
[45] Date of Patent: Sep. 14, 1999

[54] DEGAUSSING CIRCUIT EMPLOYING FILTER FOR IMPROVED PERFORMANCE

[75] Inventor: Ki-Young Jang, Kyungki-do, Rep. of Korea

[73] Assignee: SamSung Electronics Co., Ltd., Kyungki-do, Rep. of Korea

[21] Appl. No.: 09/086,337

[22] Filed: May 29, 1998

[30] Foreign Application Priority Data

May 29, 1997 [KR] Rep. of Korea ................ 97-21521

[51] Int. Cl.$^6$ .................................................. H01J 29/06
[52] U.S. Cl. .................................................. 315/8; 361/149
[58] Field of Search ................................. 315/8, 85, 370; 348/819, 820; 361/139, 149, 150

[56] References Cited

U.S. PATENT DOCUMENTS 3,784,868  1/1974  Shinkai et al. ........................ 315/8
5,789,872  8/1998  Kohga et al. ......................... 315/8

Primary Examiner—Michael B Shingleton
Attorney, Agent, or Firm—Robert E. Bushnell, Esq.

[57] ABSTRACT

A degaussing circuit is adapted to overcome a problem with limitations in the design of a printed circuit board under the safety regulations. The degaussing circuit is realized by making use of the horizontal deflection wave generated by a horizontal deflection circuit, and includes: a degaussing control section for detecting a horizontal frequency from the horizontal deflection wave received from the horizontal deflection circuit; and a degaussing coil for eliminating the earth magnetic field caused by a DC component from the horizontal frequency received from the degaussing control section.

14 Claims, 6 Drawing Sheets

DEGAUSSING CIRCUIT EMPLOYING FILTER FOR IMPROVED PERFORMANCE

CLAIM OF PRIORITY

This application makes reference to, incorporates the same herein, and claims all benefits accruing under 35 U.S.C. § 119 from my applications entitled DEGAUSSING CIRCUIT filed in the Korean Industrial Property Office on the 29th of May 1997 and there duly assigned Ser. No. P97-21521 by that Office.

BACKGROUND OF THE INVENTION

1. Technical Field

The present invention relates to a degaussing circuit and, more particularly to a degaussing circuit which is adapted to eliminate the earth magnetic field of a direct current (DC) component formed in the shadow mask provided inside a cathode ray tube (CRT) by making use of a horizontal deflection wave generated by a horizontal deflection circuit for the purpose of troubleshooting the fuzzy indistinct colors.

2. Related Art

In general, display devices employing a CRT amplify or boost the video signals generated by a video signal source, such as a computer, and project the electron beams with electron guns built into the CRT, creating a picture. That is, the electron beams which are projected from the electron guns in response to the video signals strike the phosphor coating through holes formed in the shadow mask in such a manner that a picture is created.

Where a DC magnetic field is formed in the shadow mask, the electron beams are hard to project onto the appropriate positions on the screen, with the consequence that fuzzy indistinct colors appear on the screen. A degaussing coil is generally used to scatter the DC magnetic field formed in the shadow mask.

In some arrangements, first and second degaussing coils are employed to scatter the DC magnetic field formed in the shadow mask of the display. A problem arises in such arrangement in that design limitations imposed on the printed circuit board by safety regulations cannot be met.

Therefore, there is a need for the development of a degaussing circuit which can meet the design requirements on a printed circuit board as limited by safety regulations.

SUMMARY OF THE INVENTION

To achieve these and other advantages and in accordance with the purpose of the present invention, as embodied and broadly described, a degaussing circuit includes: a degaussing control section for detecting a horizontal frequency from a horizontal deflection wave received from a horizontal deflection circuit; and a degaussing coil for eliminating the magnetic field caused by a DC component from the horizontal frequency received from the degaussing control section.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1:
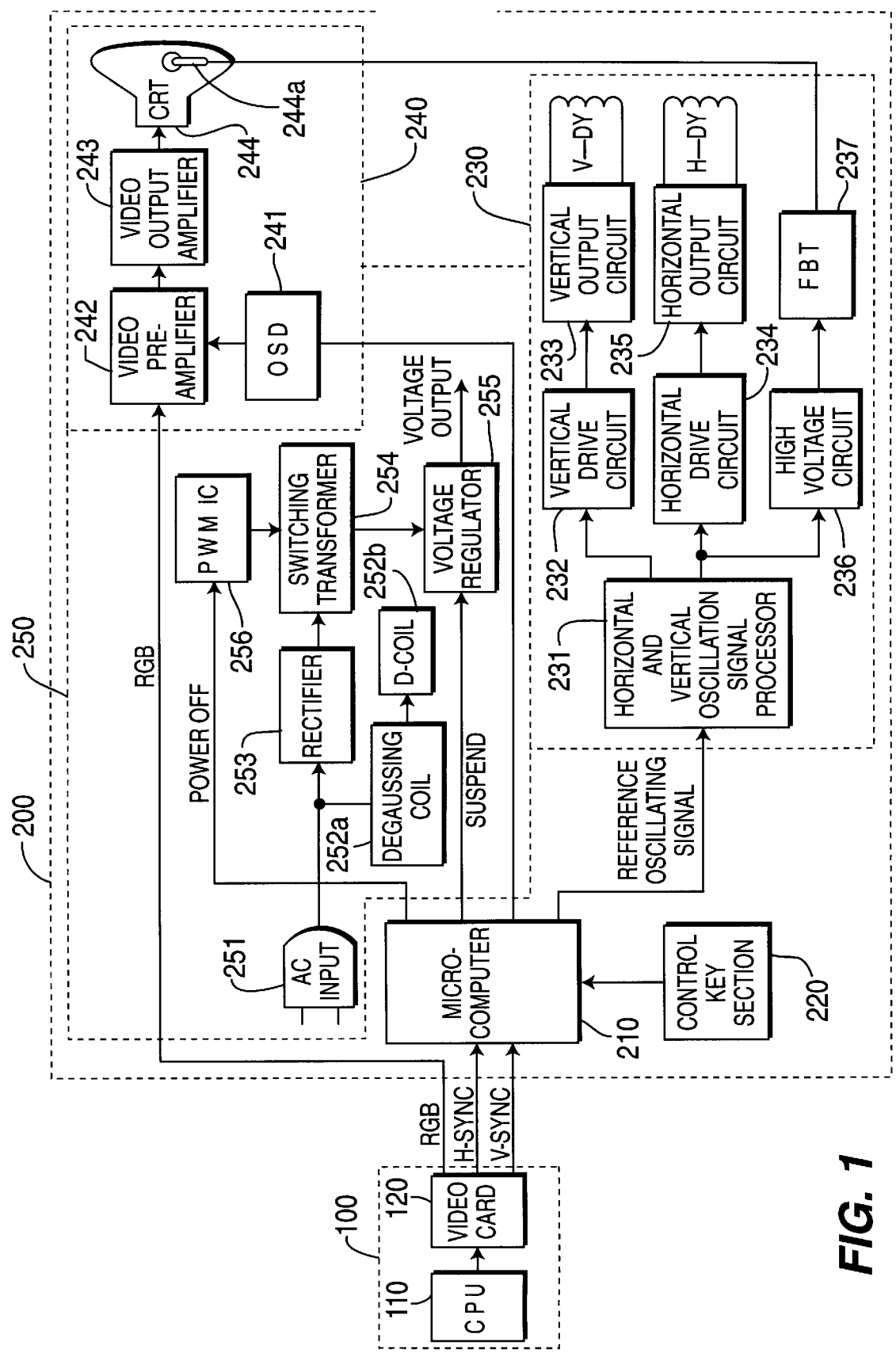
FIG. 1 is a block diagram of the internal circuit of a display device.

FIG. 1 is a block diagram showing the internal circuit of a display device.

As shown in FIG. 1, computer 100 is composed of a CPU 110 for processing a keyboard signal and thereby generating resulting output data, and a video card 120 for processing the output data of the CPU 110 to from R, G and B video signals, and further generating horizontal and vertical sync signals H-SYNC and V-SYNC, respectively, which are used to synchronize the R, G and B video signals Display device 200, which is responsive to the R, G and B video signals and the horizontal and vertical sync signals H-SYNC and V-SYNC, respectively, from the video card 120 built into the computer 100, is composed of: a microcomputer 210 responsive to the horizontal and vertical sync signals H-SYNC and V-SYNC, respectively, for discriminating a resolution; a control key section 220 for generating an image adjusting signal to control the screen of the display device 200; a horizontal and vertical output circuit section 230 responsive to the image adjusting signal and a reference oscillating signal generated by the microcomputer 210 for synchronizing a raster; a video circuit section 240 for boosting the R, G and B video signals from the video card 120 and displaying them; and a power supply circuit section 250 for supplying a drive voltage to the microcomputer 210, horizontal and vertical output circuit section 230, and video circuit section 240.

Below is a detailed description of the respective blocks in the display device 200.

Horizontal and vertical sync signals H-SYNC and V-SYNC, respectively, generated by the video card 120 of the computer 100 are fed into the microcomputer 210 which stores various screen control data, and the microcomputer 210 generates an image adjusting signal and a reference oscillating signal in response to a screen control signal from the control key section 220.

Receiving the image adjusting signal and the reference oscillating signal from the microcomputer 210, a horizontal and vertical oscillating signal processor 231 applies a vertical pulse to a vertical drive circuit 232, wherein the vertical pulse is used to control the switching rate of a sawtooth wave generating circuit in response to the horizontal and vertical sync signals H-SYNC and V-SYNC, respectively, received from the video card 120.

As regards vertical drive circuit 232, two types of circuit are most widely used: a single step vertical amplification type and an emitter follower type. The emitter follower type vertical drive circuit has the base of a transistor therein used as an input, and the emitter thereof used as an output. Hence, the vertical drive circuit 232 normally performs an operation for the improvement of linearity and not gain. Such a vertical drive circuit 232 supplies a boosted drive current to a vertical output circuit 233, which provides a sawtooth current corresponding to the vertical sync pulse to a vertical deflection yoke (V-DY) and determines a vertical scanning period according to the sawtooth current.

In addition, a horizontal drive circuit 234 is responsive to a horizontal oscillating signal generated by the horizontal and vertical oscillating processor 231, and accordingly generates a drive current sufficient to turn on/off the horizontal output circuit 235.

Upon receipt of the drive current from the horizontal drive circuit 234, the horizontal output circuit 235 provides a sawtooth current to the horizontal deflection yoke (H-DY), determining a horizontal scanning period according to the sawtooth current. Such a horizontal drive circuit 234 may be divided into two classes: an in-phase type wherein the output is turned ON when the drive terminal is ON, and an out-of-phase type wherein the output is OFF when the drive terminal is ON.

In order to supply a stable DC voltage to anode 244a of a CRT 244, a high-voltage circuit 236 and a flyback transformer (FBT) 237 generate a high voltage according to the horizontal pulse provided by the horizontal and vertical oscillating signal processor 231. The generated high voltage is applied to the anode 244a of the CRT 244 so as to form a high voltage across the anodic surface of the CRT 244.

In the video circuit section 240, an OSD (On Screen Display) IC 241 is provided with OSD data which has been generated by the microcomputer 210 at the choice of the user. OSD IC 241 processes the OSD data to provide an OSD gain signal to a video pre-amplifier 242.

Video pre-amplifier 242 which receives the OSD gain signal is provided with the R, G and B video signals generated by the video card 120. Upon receipt the OSD gain signal and the R, G and B video signals, the video pre-amplifier 242 functions as a low-voltage amplifier and selectively boosts the R, G and B video signals or the OSD gain signal to a limited voltage level.

For example, a signal of less than 1 peak to peak voltage (hereinafter, referred to as $V_{pp}$) is boosted to a signal of 4 to 6 $V_{pp}$. A video output amplifier 243 further boosts the R, G and B video signals or OSD gain signal of 4 to 6 $V_{pp}$ to those of 40 and 60 $V_{pp}$, supplying energy to the respective pixels of the CRT 244 to display an image.

The picture displayed by the CRT 244 according to the R, G and B video signals or the OSD signal has its scanning period determined by the horizontal and vertical deflection yokes H-DY and V-DY, respectively, and is visually displayed on the screen of the CRT 244. The R, G and B video signals or the OSD signal, which have been boosted by the video output amplifier 243, are displayed as a picture with luminance regulated by the high voltage formed across the anodic surface of CRT 244.

An alternating current (hereinafter, referred to as "AC") is fed into an AC input terminal 251 of the power supply circuit section 250, which provides a drive voltage for displaying the R, G and B video signals on the screen of the display device 200. The AC is applied to a first degaussing coil 252a and to a second degaussing coil 252b, troubleshooting the fuzzy indistinct colors caused by the influence of the earth magnetic field or external environment.

In this case, applying an AC to the second degaussing coil 252b momentarily for 2 to 8 seconds scatters the magnetic field of a DC component formed across the shadow mask in CRT 244, and thereby prevents the magnetic field from causing unstable deflection of the electron beams.

The AC is normally rectified into a DC by a rectifier 253 and the DC is provided to a switching transformer 254, so that the switching transformer 254 supplies various drive voltages required in the display device 200 through a voltage regulator 255. In this case, PWM (Pulse Width Modulation) IC 256 controls the switching operation of the switching transformer 254, stabilizing the output voltage of the transformer 254.

Microcomputer 210 is under the control of a DPMS (Display Power Management Signaling) mode which is used to economize power consumed in the display device 200. In this respect, the microcomputer 210 enters the power-off mode and the suspend mode depending on the presence of horizontal and vertical sync signals H/V-SYNC, and accordingly saves power in the display device 200.

Figure 2:
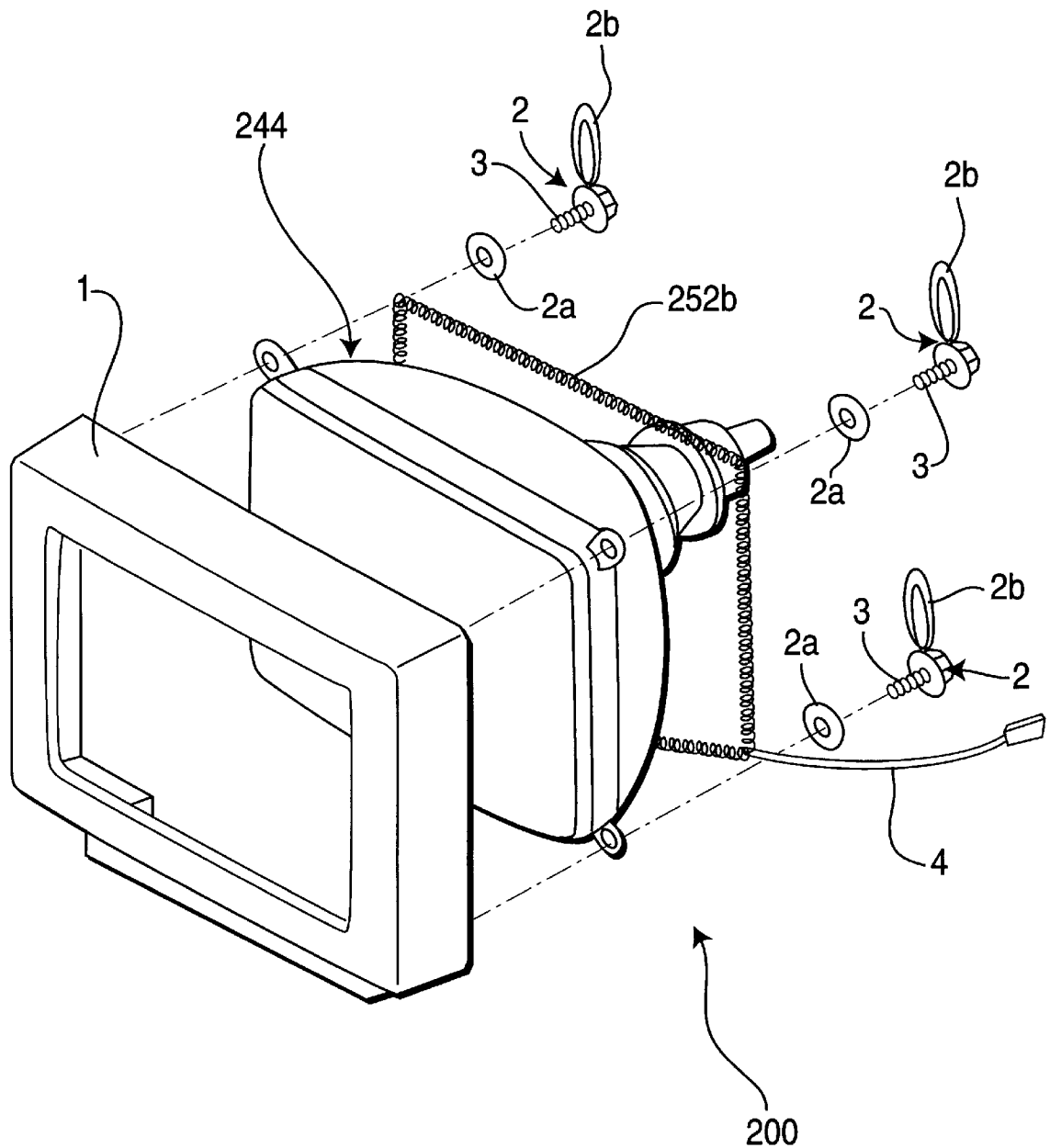
FIG. 2 is an exploded perspective view of the structure having a degaussing coil fixed to the CRT shown in FIG. 1.

With reference to FIG. 2, a description is now given for the structure of the display device 200 with degaussing coil 252b fixed thereto.

FIG. 2 is an exploded perspective view of the structure having the degaussing coil 252b shown in FIG. 1, wherein the degaussing coil 252b is disposed outside the CRT 244 by means of plural clamps 2, each of which has a plate 2a and a resinous string 2b.

In further detail, the CRT 244 is inserted into a front case 1 of the display device 200 and the plate 2a of each clamp 2 is fit to a set screw 3, fixing the CRT 244 into the front case 1. The degaussing coil 252b is then fixed to the outside of the CRT 244 with the plural resinous strings 2b of the clamps 2.

After assembly, the first degaussing coil 252a is supplied with AC through the AC input terminal 251 and applies the AC to the second degaussing coil 252b via an AC supply line 4. This AC is used to degauss the earth magnetic field formed in the shadow mask.

In a display device such as described above, the AC supplied through the AC input terminal 251 is used to scatter the earth magnetic field; however, a problem arises in that the design of the printed circuit board is limited by safety regulations.

Figure 3:
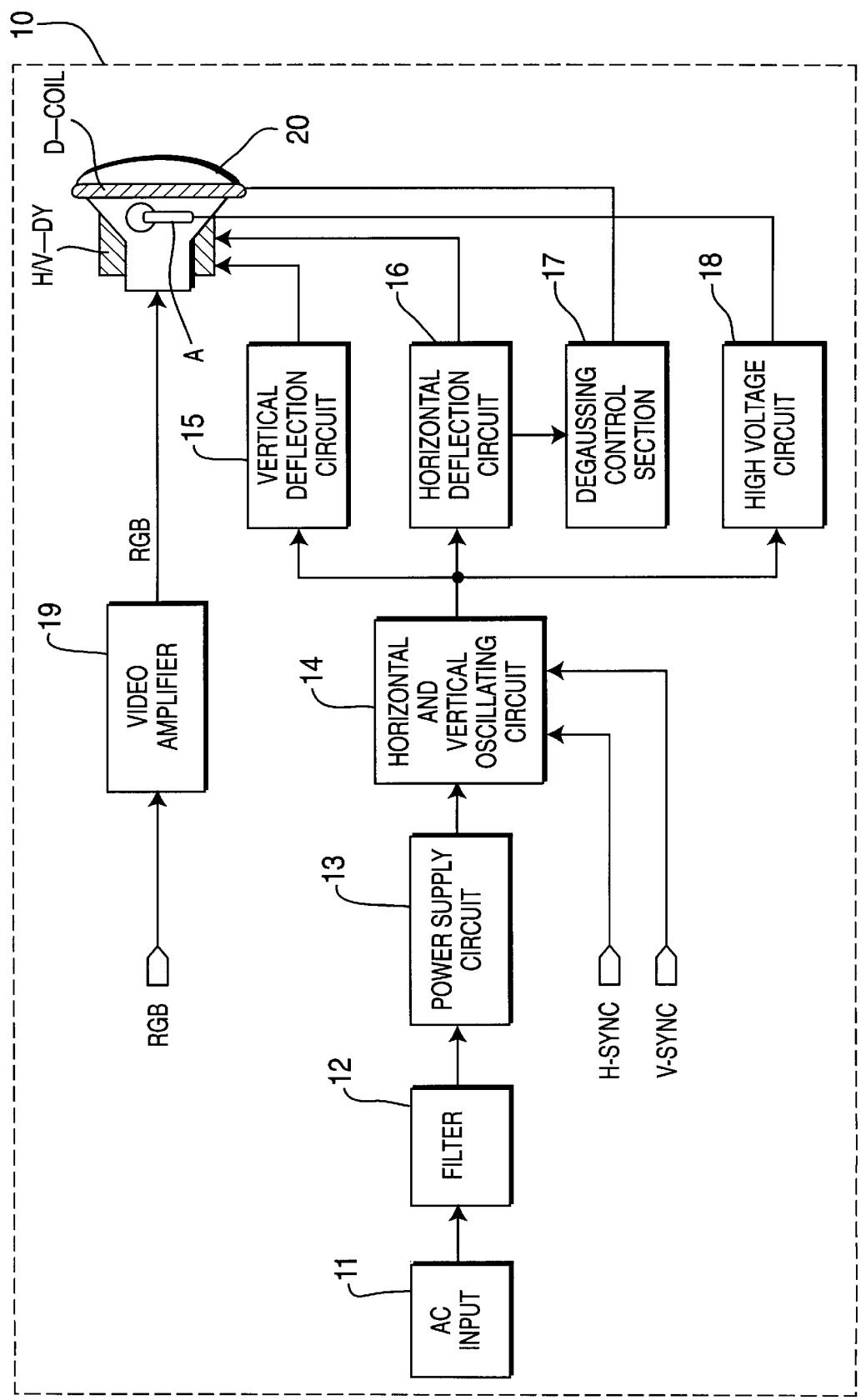
FIG. 3 is a block diagram of the internal circuit of a display device in accordance with the present invention.

FIG. 3 is a block diagram of the internal circuit of a display device in accordance with the present invention.

As shown in the figure, the display device 10 is composed of: an AC input terminal 11 receptive to an alternating current; a filter 12 for removing noise from the AC supplied by the AC input terminal 11, the noise being incorporated into the AC by an AC supply line (not shown); a power supply circuit 13 for rectifying the AC from the filter 12, switching it, and thereby generating a DC voltage; a horizontal and vertical oscillating circuit 14 driven by the DC voltage supplied by the power supply circuit 13, and generating horizontal and vertical oscillating pulses in response to horizontal and vertical sync signals, respectively; a vertical deflection circuit 15 for providing a vertical sawtooth current to a horizontal/vertical deflection yoke H/V-DY in response to the vertical oscillating pulse generated by the horizontal and vertical oscillating circuit 14; a horizontal deflection circuit 16 for providing a horizontal sawtooth current to the horizontal/vertical deflection yoke H/V-DY in response to the horizontal oscillating pulse generated by the horizontal and vertical oscillating circuit 14; a degaussing control section 17 for detecting a horizontal frequency from a horizontal deflection wave generated by the horizontal deflection circuit 16; a degaussing coil D-COIL for removing the earth magnetic field caused by DC component from the horizontal frequency generated by the degaussing control section 17; a high voltage circuit 18 for generating a high voltage in response to the oscillating pulses generated by the horizontal and vertical oscillating circuit 14; a video amplifier 19 for boosting R, G and B video signals generated by a computer (not shown); and a CRT 20 for troubleshooting the fuzzy indistinct colors with the magnetic field formed in the degaussing coil D-COIL, and displaying the R, G and B video signals generated by the video amplifier 19 according to the period of the horizontal/vertical sawtooth current generated by the horizontal/vertical deflection yoke H/V-DY.

The display device as thus described operates as follows.

An AC is fed into the display device 10 through the AC input terminal 11 and a noise component is removed by the filter 12. The AC, free from noise, is then rectified into a DC voltage in the power supply circuit 13, and the generated DC voltage is switched so as to supply required drive voltages to the respective circuit blocks in the display device 10.

Horizontal and vertical oscillating circuit 14, which is driven by the DC voltage from the power supply circuit 13, is responsive to the horizontal and vertical sync signals H-SYNC and V-SYNC, respectively, for synchronizing the R, G and B video signals generated by the computer, and thereby generates horizontal and vertical oscillating pulses according to the horizontal and vertical sync signals H-SYNC and V-SYNC, respectively.

The vertical oscillating pulse generated by the horizontal and vertical oscillating circuit 14 is provided to the vertical deflection circuit 15, which generates a vertical deflection wave according to the vertical oscillating pulse. This vertical deflection wave is applied to the horizontal/vertical deflection yoke H/V-DY, generating a vertical sawtooth current.

Horizontal deflection circuit 16 generates a horizontal deflection wave in response to the horizontal oscillating pulse from the horizontal and vertical oscillating circuit 14, and the horizontal deflection wave enables the horizontal/vertical deflection yoke H/V-DY to generate a horizontal sawtooth current.

In addition, the R, G and B video signals generated by the computer are amplified by the video amplifier 19, and are then applied to the CRT 20. The CRT 20 creates a picture by scanning the R, G and B video signals according to the period of the horizontal/vertical sawtooth current generated by the horizontal/vertical deflection yoke H/V-DY.

The high voltage circuit 18 divides the oscillating pulses received from the horizontal and vertical oscillating circuit 14, and applies a high voltage to the anodic terminal A built into the CRT 20, forming an anodic surface in the CRT 20. This anodic surface in the CRT 20 directs the electron beams projected from electron guns (not shown) according to the R, G and B video signals, thereby affecting the luminance of the picture.

As described above, when the R, G and B video signals generated by the computer (not shown) are provided to the display device 10 again under such a condition that the display device 10 does not display the video signals for a specified period of time, the DC component causes an earth magnetic field to occur in a shadow mask (not shown).

The earth magnetic field generated by the DC component in the shadow mask makes it harder for the electron beams to appropriately pass through the holes formed in the shadow mask, causing a problem of fuzzy indistinct colors. To prevent the fuzzy indistinct colors, the horizontal deflection wave generated by the horizontal deflection circuit 16 is used to scatter the earth magnetic field caused by the DC component formed in the shadow mask.

To explain in more detail, the horizontal deflection wave for synchronizing the R, G and B video signals in the horizontal deflection circuit 16 is provided to the degaussing control section 17, which detects a horizontal frequency and applies it to the degaussing coil D-COIL fixed to the outside of the CRT 20.

Upon receipt of the horizontal frequency generated by the degaussing control section 17 for several seconds, the degaussing coil D-COIL eliminates the earth magnetic field caused by the DC component as formed in the shadow mask. Consequently, the electron beams projected from the electron guns built into the CRT 20 can appropriately pass through the holes formed in the shadow mask, displaying a normal picture on the screen CRT 20.

Below is a more detailed description of the degaussing control section 17 with reference to FIG. 4.

Figure 4:
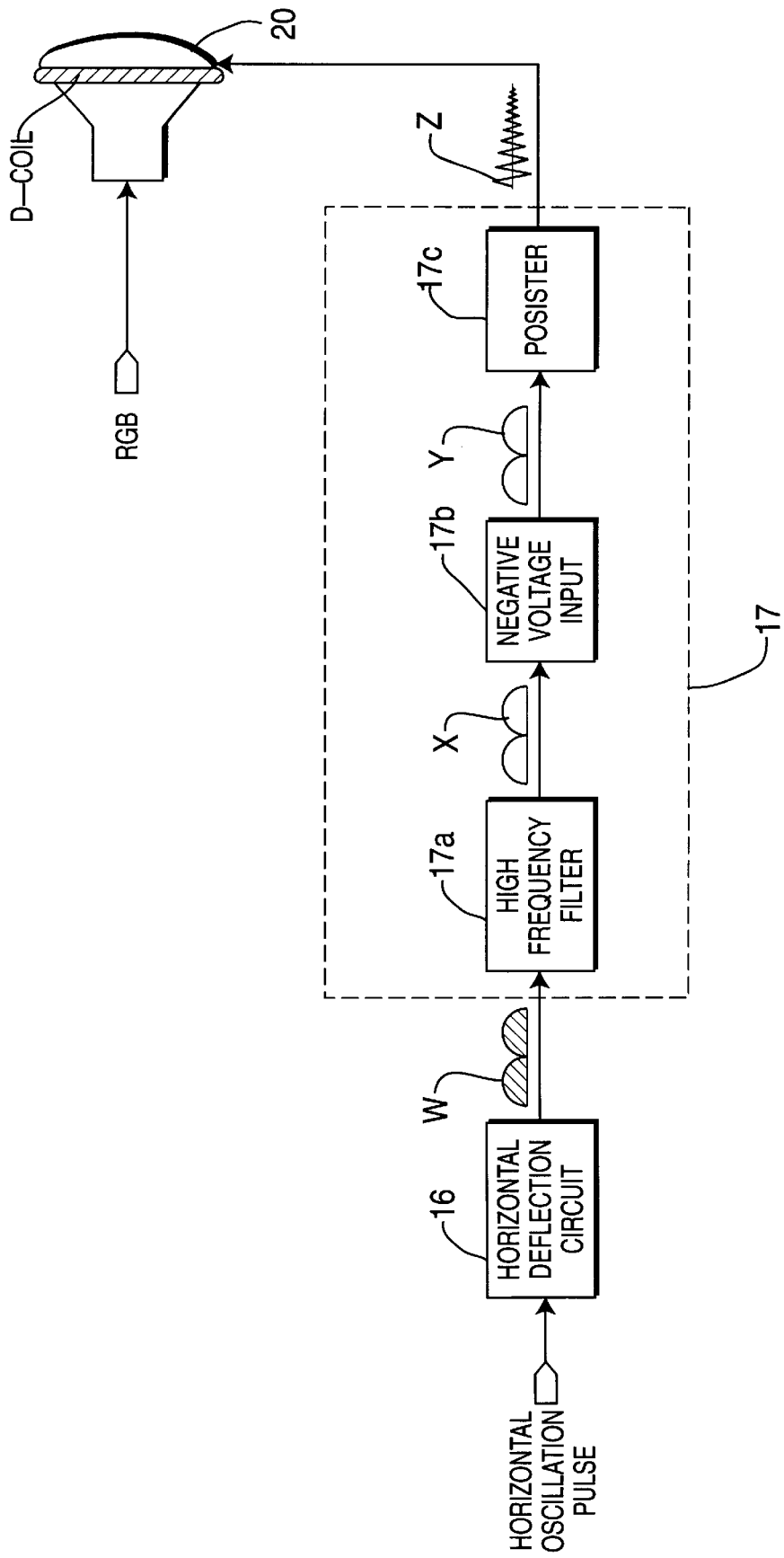
FIG. 4 is a detailed block diagram of the degaussing control section shown in FIG. 3.

FIG. 4 is a detailed block diagram of the degaussing control section shown in FIG. 3. As shown in the figure, there are included: a horizontal deflection circuit 16 for providing a horizontal sawtooth current to the horizontal/vertical deflection yoke H/V-DY in response to the horizontal oscillating pulse generated by the horizontal and vertical oscillating circuit 14; a degaussing control section 17 for detecting a horizontal frequency in response to the horizontal deflection wave generated by the horizontal deflection circuit 16; and a degaussing coil D-COIL for eliminating the earth magnetic field caused by the DC component in response to the horizontal frequency generated by the degaussing control section 17.

Degaussing control section 17 is composed of: a high frequency filter 17a for filtering the horizontal deflection wave generated by the horizontal deflection circuit 14 to block a horizontal high frequency thereof; a negative voltage input 17b for applying a negative voltage to the frequency output X from the high frequency filter 17a so that the output X is overlapped with the negative voltage; and a posister 17c for turning on the resulting pulse Y for a specified period of time.

Such an arrangement operates as follows. In response to a horizontal oscillating pulse generated by the horizontal and vertical oscillating circuit 14, the horizontal deflection circuit 16 generates a horizontal deflection wave having the waveform W, as shown in FIG. 4. The horizontal deflection wave W is provided to the high frequency filter 17a of the degaussing control section 17.

High frequency filter 17a detects a vertical high frequency component having the waveform X in the horizontal deflection wave from the horizontal deflection circuit 16. That is, the horizontal deflection wave contains both phase and frequency components and the high frequency filter 17a removes the phase component of the horizontal deflection wave, thereby blocking the horizontal high frequency of the horizontal deflection wave.

The frequency output X passed by the high frequency filter 17a is overlapped with a negative voltage applied by the negative voltage input 17b, so that the resulting pulse has the waveform Y, and is fed into the posister 17c. The posister 17c turns on the pulse Y having the frequency output X overlapped with the negative voltage.

Posister 17c in this case gives off heat while it turns on the pulse having the frequency output X overlapped with the negative voltage for several seconds. As the temperature of the posister 17c rises to a specified level, the posister 17c becomes open with an increase in its impedance, so that the pulse is not turned on.

The resulting pulse, in which the frequency output X is overlapped with the negative voltage under the control of the posister 17c, has the waveform Z, and is provided to the degaussing coil D-COIL fixed to the outside of the CRT 20, thereby scattering the earth magnetic field caused by the DC component, as formed in the shadow mask.

As a result, the electron beams projected from the electron guns (not shown) built into the CRT 20 can pass appropriately through the holes formed in the shadow mask, displaying a normal picture on the screen CRT 20.

Figure 5:
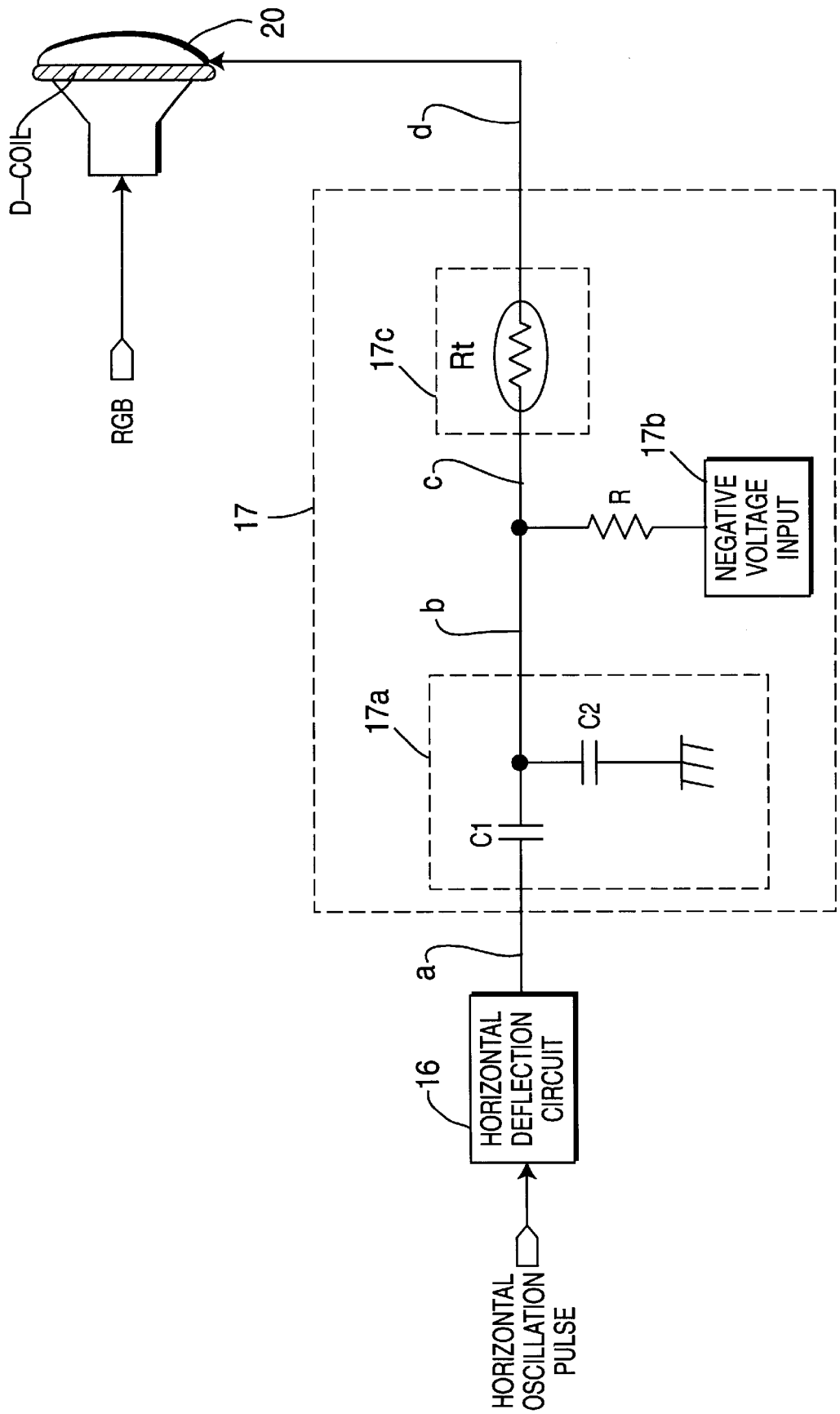
FIG. 5 is a detailed circuit diagram of the high frequency filter shown in FIG. 4.

The following description is given for the high frequency filter 17*a* in the degaussing control section 17 with reference to FIG. 5.

FIG. 5 is a detailed circuit diagram of the high frequency filter shown in FIG. 4. As shown in the figure, the degaussing control section 17 is composed of: a high frequency filter 17*a* for filtering the horizontal deflection wave generated by the horizontal deflection circuit 14 so as to block a horizontal high frequency thereof; a negative voltage input 17*b* for applying a negative voltage to the frequency passed by the high frequency filter 17*a* in such a manner that the frequency is overlapped with the negative voltage; and a posister 17*c* for turning on the resulting pulse for a specified period of time.

High frequency filter 17*a* includes capacitors C1 and C2 which block a horizontal high frequency from the horizontal deflection wave generated by the horizontal deflection circuit 16.

Such arrangement operates as follows.

The horizontal deflection wave generated by the horizontal deflection circuit 16 is provided to the high frequency filter 17*a* in the degaussing control section 17. Filter 17*a* removes the phase component of the horizontal deflection wave by means of capacitors C1, and C2, thereby blocking the frequency output of filter 17*a*.

The horizontal high frequency is overlapped with a negative voltage supplied by the negative voltage input 17*b*. More specifically, the frequency generated by the filter 17*a* is overlapped with the negative voltage whose level has been regulated through resistance R, and the resulting pulse is fed into the posister 17*c* or Rt This posister 17*c* or Rt turns on the pulse applied thereto.

The temperature of the posister 17*c* or Rt rises as a result of the pulse applied thereto, so that its impedance is increased to cause the posister 17*c* or Rt to open. As a result, the posister 17*c* or Rt can no longer turn on the pulse having the frequency output overlapped with the negative voltage and this operation lasts for several seconds.

Under the control of the posister 17*c* or Rt, the degaussing coil D-COIL is supplied with an AC component for several seconds in response to the pulse having the frequency output overlapped with the negative voltage, and thereby scatters the earth magnetic field caused by the DC component, as formed in the shadow mask, making it possible to prevent the fuzzy indistinct colors of the picture displayed on the CRT 20.

The waveforms generated by the degaussing control section 17 are shown in FIGS. 6A–6D.

Figure 6A:
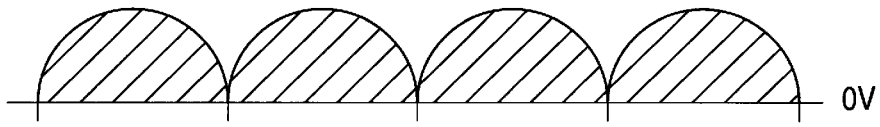
FIGS. 6A–6D are waveform diagrams of the input/output signals in the respective block shown in FIG. 5.

FIGS. 6A–6D are waveform diagrams of the input/output signals of the respective blocks shown in FIG. 5. As shown in the figure, the waveform of FIG. 6A is a horizontal deflection wave generated at the point "a defining the output of the horizontal deflection circuit 16 in FIG. 5. This horizontal deflection wave contains both phase and frequency components.

Figure 6B:
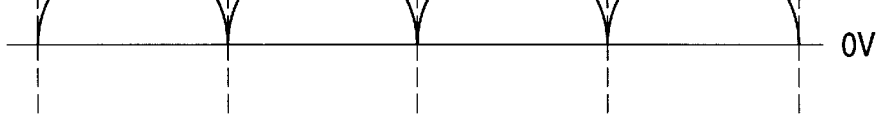
Figure 6C:
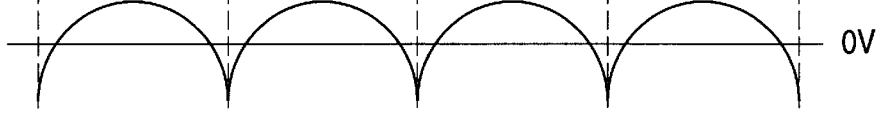
Figure 6D:
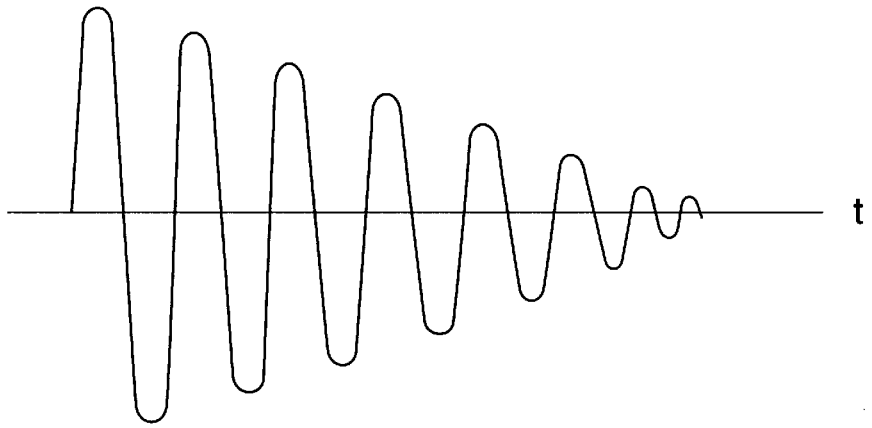

When the phase component of the horizontal deflection wave is removed, the frequency having the waveform of FIG. 6B is generated at the point "b", defining the output of the high frequency filter 17*a* in FIG. 5. The waveform, of FIG. 6B is overlapped with a negative voltage supplied by the negative voltage input 17*b* of FIG. 5 to form the waveform of FIG. 6C at the point "c" defining the junction between resistor R and posister Rt in FIG. 5. The waveform c of FIG. 6C is then generated as the waveform of FIG. 6D at the point "d" (the output of posister Rt in FIG. 5) for a specified period of time under the control of the posister 17*c*.

Accordingly, the degaussing circuit 17 is realized by use of the horizontal deflection wave generated by the horizontal deflection circuit 16 located at the secondary terminal of the power circuit without using the AC input which is to supply the AC, resulting in enhancement of the efficiency in designing a printed circuit board.

In view of the present invention as described above, it is possible to overcome the problem with the limitations in the design of the printed circuit board under the safety regulations by realizing the degaussing circuit by making use of the horizontal deflection wave generated by the horizontal deflection circuit.

It will be apparent to those skilled in the art that various modifications and variations can be made in the degaussing circuit according to the present invention without departing from the spirit or scope of the invention. Thus, it is intended that the present invention cover the modifications and variations of this invention provided they come within the scope of the appended claims and their equivalents.

What is claimed is:

1. A degaussing circuit, comprising:

degaussing control means for detecting a horizontal frequency from a horizontal deflection wave received from a horizontal deflection circuit; and degaussing coil means connected to said degaussing control means for eliminating an earth magnetic field caused by a DC component from the horizontal frequency received from the degaussing control means;

wherein said degaussing control means includes a high frequency filter connected to said horizontal deflection circuit for filtering the horizontal deflection wave received from the horizontal deflection circuit to block a horizontal high frequency thereof.

2. The degaussing circuit as defined in claim 1, wherein the degaussing control means further comprises:

a negative voltage input for supplying a negative voltage to the horizontal high frequency passed by the high frequency filter in order to overlap the horizontal high frequency with the negative voltage; and a posister connected to said high frequency filter and to said negative voltage input for turning on a pulse having the horizontal high frequency overlapped with the negative voltage for a specified period of time.

3. The degaussing circuit as defined in claim 1, wherein the high frequency filter comprises first and second capacitors for passing the horizontal high frequency from the horizontal deflection wave generated by the horizontal deflection circuit.

4. The degaussing circuit as defined in claim 2, further comprising a resistance disposed between an output of said high frequency filter and said negative voltage input for adjusting the level of the negative voltage supplied by the negative voltage input.

5. A degaussing circuit for use in a display device having a horizontal deflection circuit which generates a horizontal deflection wave having a horizontal frequency, said circuit comprising:

degaussing control means for detecting the horizontal frequency from the horizontal deflection wave received from said horizontal deflection circuit; and degaussing coil means connected to said degaussing control means for eliminating a magnetic field caused by a direct current component from the horizontal frequency received from the degaussing control means;

wherein said degaussing control means includes a high frequency filter connected to said horizontal deflection circuit for filtering the horizontal deflection wave received from the horizontal deflection circuit so as to block a horizontal high frequency thereof.

6. The circuit as defined in claim 5, wherein said degaussing control means further comprises a posister connected between said high frequency filter and said degaussing coil means for turning on a pulse having the horizontal high frequency.

7. The circuit as defined in claim 5, wherein said degaussing control means further comprises a negative voltage input for supplying a negative voltage to the horizontal high frequency.

8. The circuit as defined in claim 7, wherein said degaussing control means further comprises a posister for turning on a pulse having a horizontal high frequency.

9. The circuit as defined in claim 8, wherein said degaussing control means further comprises a resistor connected between an output of said high frequency filter and said negative voltage input.

10. The circuit as defined in claim 7, wherein said high frequency filter comprises a first capacitor connected between said horizontal deflection circuit and said negative voltage input, and a second capacitor connected between an output side of said first capacitor and ground.

11. The circuit as defined in claim 10, wherein said degaussing control means further comprises a resistor connected between said first and second capacitors, on the one hand, and said negative voltage input, on the other hand.

12. The circuit as defined in claim 5, wherein said degaussing control means further comprises a negative voltage input connected to said high frequency filter, and a resistor connected between said high frequency filter and said negative voltage input.

13. The circuit as defined in claim 12, wherein said high frequency filter comprises a first capacitor connected between said horizontal deflection circuit and said resistor, and a second capacitor connected between an output side of said first capacitor and ground.

14. The circuit as defined in claim 7, wherein said degaussing control means further comprises a resistor connected between an output of said high frequency filter and said negative voltage input.

* * * * *